Figure 1:
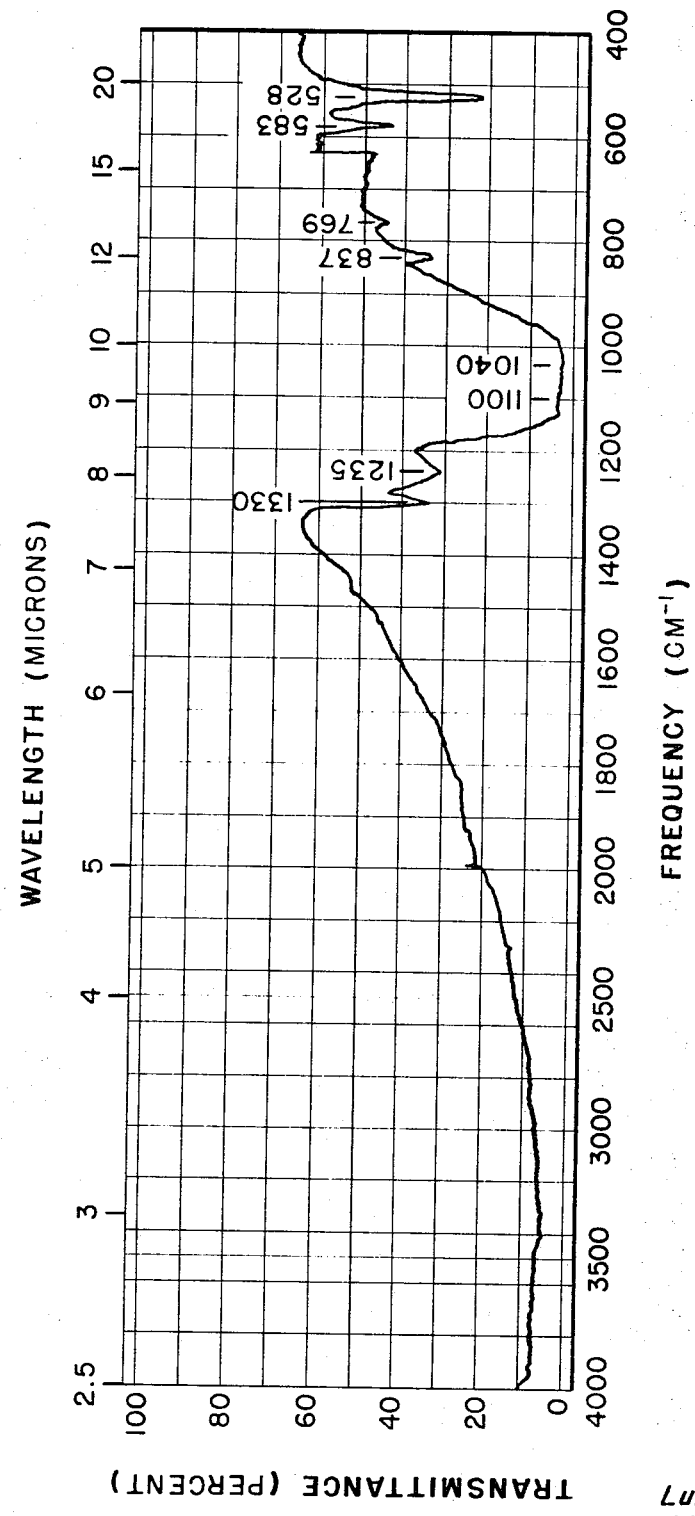

United States Patent

[11] 3,615,269

[72] Inventors Luke A. Schaap
 South Holland;
 Alex Zletz, Chicago Heights, Ill.; Thomas
 D. Nevitt, Valparaiso, Ind.
[21] Appl. No. 551,086
[22] Filed May 18, 1966
[45] Patented Oct. 26, 1971
[73] Assignee Standard Oil Company
 Chicago, Ill.

[54] CERTAIN FLUORODIAZONIUM COMPOUNDS
 3 Claims, 3 Drawing Figs.
[52] U.S. Cl. .................................................. 23/357,
 23/205, 23/356, 23/358, 149/36
[51] Int. Cl. .................................................. C01h 21/52
[50] Field of Search ........................................... 23/205,
 356, 357, 358, 368

[56] References Cited
 UNITED STATES PATENTS
 3,109,711 11/1963 Lawton et al. ................. 23/356 X
 3,244,483 4/1966 Lawton et al. ................. 23/356 X
 OTHER REFERENCES
 Stacey et al., Advances In Fluorine Chemistry, Vol. 4, 1965, Butterworth's, Washington, D.C., pp. 192–193
 Moy et al., American Chemical Society, Abstracts of Papers, 148th meeting, 1964, p. 8k
 Hoffman et al., Chemical Reviews, Vol. 62, pp. 5 and 6 (1962)

Primary Examiner—Leland A. Sebastian
Attorneys—Pike H. Sullivan, Arthur G. Gilkes and Fred R. Ahlers CLAIM: 1. As a composition of matter, fluorodiazonium tetrafluoroborate.
 2. As a composition of matter, fluorodiazonium hexafluorophosphate.

INVENTOR.
Luke A. Schaap
Alex Zletz
Thomas D. Nevitt

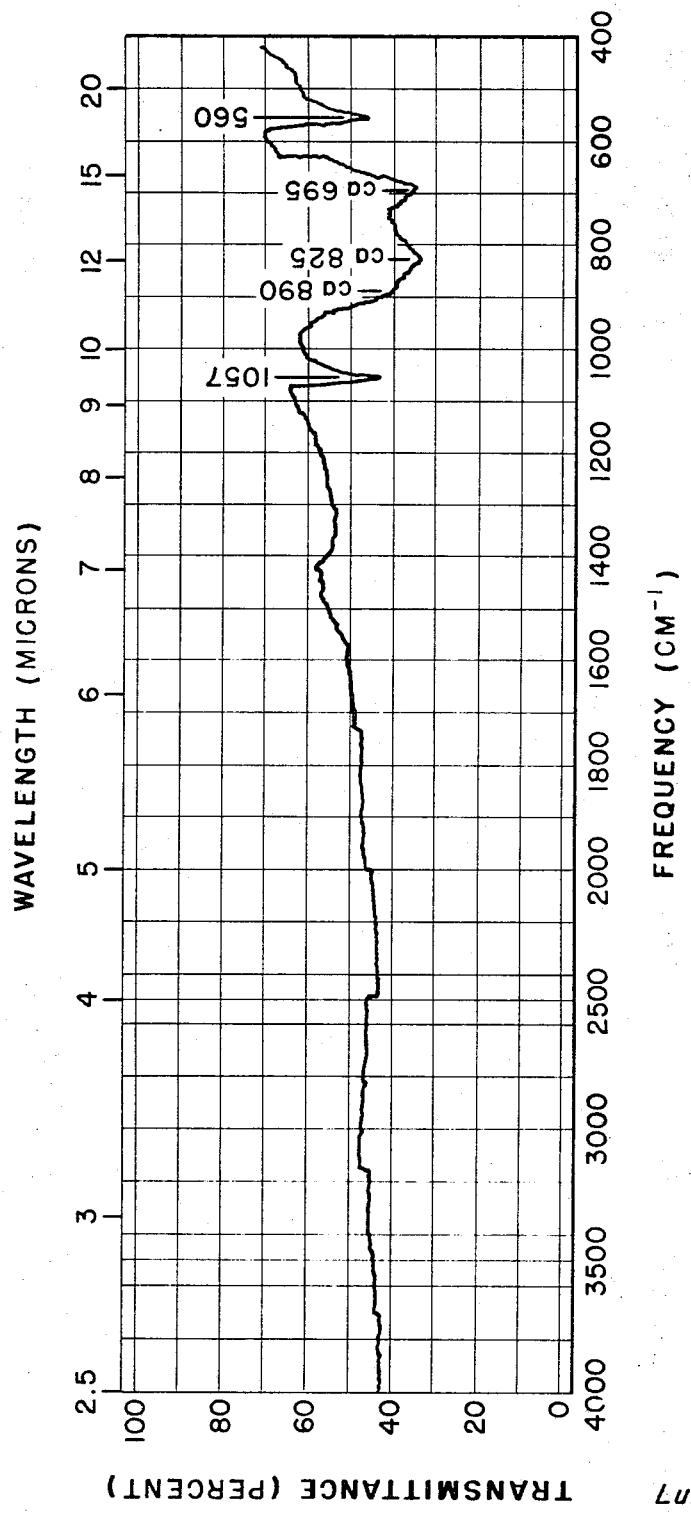

CERTAIN FLUORODIAZONIUM COMPOUNDS

This invention relates to the preparation of novel fluorine-containing compounds useful as solid rocket propellants and processes for preparing the same. More particularly, it relates to the preparation of one-to-one compounds between cis-$N_2F_2$ with $BF_3$, $PF_5$ and $SbF_5$ which may be represented as $N_2F_2:BF_3$, $N_2F_2:PF_5$ and $N_2F_2:SbF_5$, respectively. However, our infrared data, presented hereinafter, indicate these to be ionic compounds containing the $BF_4^1$, $PF_6^1$ and $SbF_6^1$ anions. We therefore believe these compounds to be fluorodiazonium salts, namely fluorodiazonium tetrafluoroborate, $N_2F^+BF_4^1$, fluorodiazonium hexafluorophosphate, $N_2F^+PF_6^1$, and fluorodiazonium hexafluoroantimonate, $N_2F^+SbF_6^1$ and shall refer to them as such, hereinafter. It also relates to the preparation of fluorodiazonium tetrafluoroborate, fluorodiazonium hexafluoroantimonate, and fluorodiazonium hexafluorophosphate, and their utilization in storing and separating the cis from the trans isomers of difluorodiazine. The cis difluorodiazine is particularly useful in initiating the vulcanization of fluoroelastomers.

The method of this invention comprises reacting difluorodiazine with inorganic fluorine-containing compounds. Representative inorganic fluorine-containing compounds are boron trifluoride, phosphorus pentafluoride, and antimony pentafluoride. The process consists of mixing in an evacuated pressure tube difluorodiazine and the inorganic fluorine compound. The pressure required to obtain compound formation must be above the dissociation pressure for the compound. This would be above about 90 p.s.i. at 20° C. for reaction with $BF_3$ but may be below atmospheric for reaction with $SbF_5$ at 20° C. The higher the reaction temperature, the greater the dissociation pressure of the compound, hence the greater the pressure required for compound formation. However, high pressures are desired, especially with $BF_3$ and $PF_5$, because high pressure favors more rapid formation of the compound. Using this process, stable white compounds are formed. The new compositions of matter formed by this process are fluorodiazonium tetrafluoroborate, fluorodiazonium hexafluoroantimonate and fluorodiazonium hexafluorophosphate. They are all useful as solid rocket propellants. These compounds are also useful as fluorinating agents and in the separation of the cis difluorodiazine from the trans isomer and also in storing the highly volatile difluorodiazine.

Figure 2:
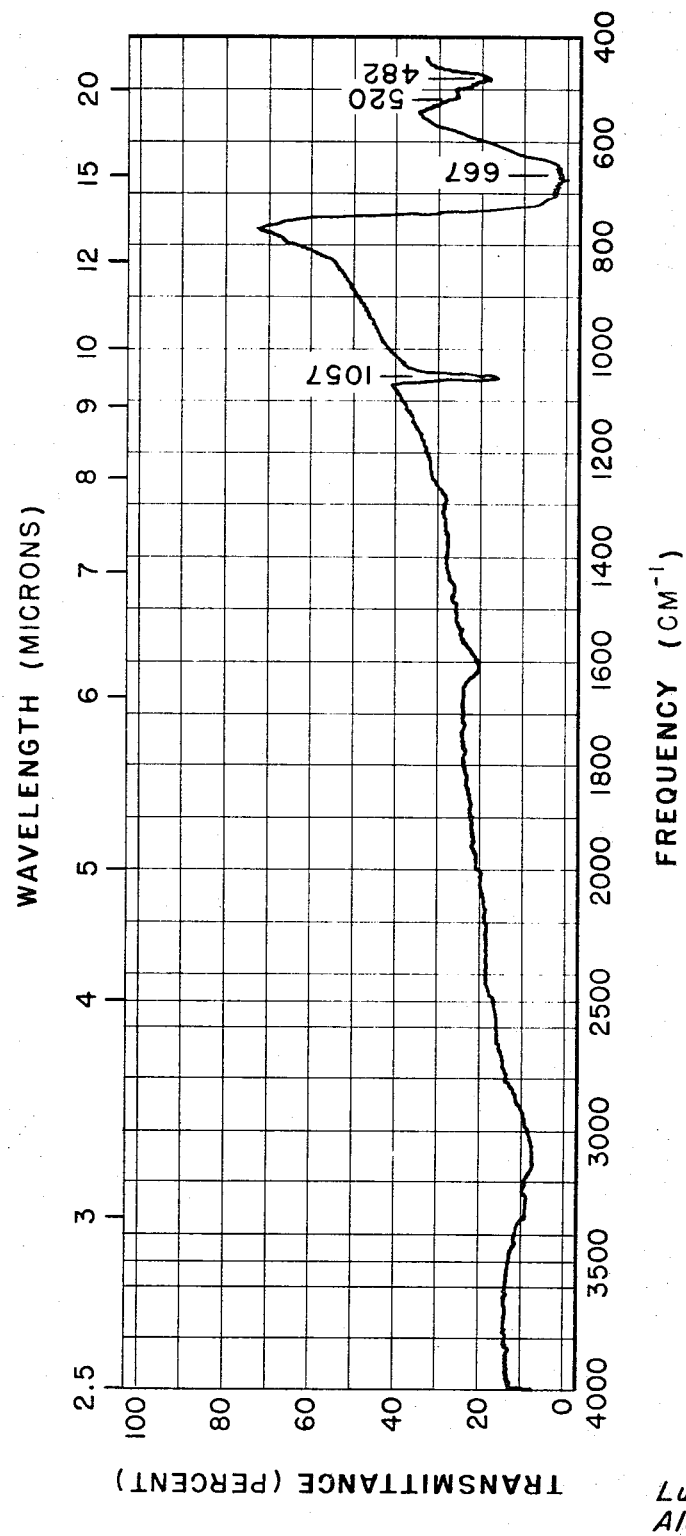

The infrared spectra of these compounds were extensively analyzed and the analyses are found in FIGS. 1, 2, and 3.

The spectrum of fluorodiazonium tetrafluoroborate of the formula $N_2F_2:BF_3$ was analyzed in FIG. 1. The product from the high-pressure reaction of a 1:1 molar mixture of $BF_3$ and cis $N_2F_2$ in the presence of $NF_3$ was used for the infrared spectrum. A sample was ground into a silver chloride window in a dry atmosphere and the spectrum was repeatable so long as silver chloride windows were tightly clamped together to prevent the moisture from attacking the solid compound. Vibrations assigned to $BF_4^1$ are as follows: 1,300 cm.$^{11}$=$v_1+v_4$ (combination); 1,100 cm.$^{11}$=$v_3$ (triply degenerate stretch; a previous spectrum of a thinner film resolved the two peak absorptions); 769 cm.$^{11}$=$v_1$ (Raman active symmetric stretch); 528 cm.$^{11}$=$v_4$ (triply degenerate deformation).

Literature spectra of tetrafluoroborate salts show some variation in the exact position of the $v_3$ absorption maxima:

| Cation | Position of $BF_4^1$ Adsorption Maxima, cm.$^{11}$ | |
|---|---|---|
| K$^+$ | 1,032 | 1,058 |
| Ag$^+$ | 1,026 | 1,064 |
| Na$^+$ | 1,036 | 1,076 |
| NH$_4^+$ | 1,030 | 1,063 |

In the spectra of the solid $N_2F_2:BF_3$, the corresponding maxima occur at the higher frequencies, 1,040 cm.$^{11}$ and 1,100 cm.$^{11}$. The $BF_4^1$ absorption is known to be complex because of isotope doubling (B$^{10}$ and B$^{11}$) and removal of degeneracy of the $v_3$ vibration of tetrahedral $BF_4^1$ when the anion is situated in a crystal field of low symmetry. As many as six components are expected, but overlapping may may obscure resolution of the individual components. The exact position of the maxima in the solid compound will depend upon the intensities of the components in the envelope that we observe, and these in turn will depend on how much the tetrahedral symmetry is distorted by the crystal field.

The absorption at 583 cm.$^{11}$ is probably a splitting of the $v_4$ degenerate deformation. The splitting observed in a number of salts is:

| Splitting of $f_d$ (F-B-F) | | | |
|---|---|---|---|
| Compound | cm.$^{-1}$ | | |
| NH$_4^+$BF$_4^-$ | 521 | 529 | |
| K$^+$BF$_4^-$ | 521 | 534 | |
| Na$^+$BF$_4^-$ | 518 | 522 | 551 |

The large splitting observed in $N_2F_2:BF_3$ may be caused by considerable distortion of the tetrahedral symmetry of $BF_4^1$.

The infrared spectrum of the dissociation products of the solid fluorodiazonium tetrafluoroborate compound showed only $BF_3$ and cis-$N_2F_2$. The spectrum of the cis$N_2F_2$ was the first we have seen that contained no trace of the strong absorption of trans-$N_2F_2$ at 1,000 cm.$^{11}$. The spectrum of fluorodiazonium hexafluoroantimonate was analyzed in FIG. 2. The infrared spectrum of $N_2F_2SbF_5$ showed the very strong absorption of the triply degenerate $v_3(SbF_6^1)$ vibration of the anion at about 667 cm.$^{11}$. The absorption noted at 1,057 cm.$^{11}$ is in the region expected for N-F stretches and probably originates in the $N_2F^+$ cation. In $NF_3$, for example, the symmetrical N-F stretch occurs at 1,032 cm.$^{11}$ and cannot be observed in $N_2F_2:BF_3$ because of the strong triply degenerate stretch of $BF_4^1$. The remaining bands, 520 cm.$^{11}$ and 482 cm.$^{11}$, were unassigned.

The spectrum of fluorodiazonium hexafluorophosphate was analyzed in FIG. 3. The $PF_6^1$ anion absorptions occur at about 825 cm.$^{11}$ and 560 cm.$^{11}$. The 1.057 cm.$^{11}$ absorption coincides strikingly with that of $N_2F_2:SbF_5$. The 695 cm.$^{11}$ absorption remains unassigned at this time.

These compounds can be used to conveniently store or handle difluorodiazine which otherwise is a gas and quite unstable. These compounds also are useful as reactive intermediates for synthesizing other materials. These compounds, their use, and preparation are further exemplified in the appended examples.

EXAMPLE I

A mixture of boron trifluoride, nitrogen trifluoride, and cis difluorodiazine, approximately equal parts by weight, was charged into a nickel high-pressure reactor. Pressure was applied to 90,000 p.s.i. and the reactor was heated to 82° C. for 1 hour. The pressure was released and the reactor was cooled. The gaseous materials were discharged and were found to contain virtually all of the nitrogen trifluoride and none of the difluorodiazine. As the reactor was vented over a period of 24 hours at room temperature the difluorodiazine and boron trifluoride were recovered. A few small particles of white solid remained in the reactor which ignited acetone on contact.

EXAMPLE II

An experiment was carried out as in example I charging the mixture of boron trifluoride, nitrogen trifluoride, and difluorodiazine to a reactor, but this time only 3,000 p.s.i. pressure was applied with the reactor at 29° C. The pressure dropped to 1,500 p.s.i. after 2.5 hours and the pressure was released. All of the nitrogen trifluoride and a small amount of the difluorodiazine were recovered immediately. After discharging for 18 hours all of the original charge was recovered.

EXAMPLE III

A preparation of the solid reaction product of difluorodiazine and boron trifluoride was carried out as in example II. Then the gases were vented and the white solid was removed from the reactor in 60 percent yield. This material looks like dry ice in appearance and fumes in air, but it does not volatilize rapidly. It may be kept by cooling in dry ice and perhaps at higher temperatures. The infrared spectrum was examined and the characteristic absorbance for fluoroborate ion was found indicating that the compound is fluorodiazonium tetrafluoroborate of the formula $N_2F^+BF_4^-$[1]. The infrared spectrum of this compound is shown in FIG. 1.

These examples show that the difluorodiazine can be recovered from the compound by warming up or releasing the pressure. Therefore, this compound may be used to store the otherwise hard-to-handle difluorodiazine. It may be recovered by reacting the compound with other materials that react with boron trifluoride such as water or nitrosyl fluoride, also.

EXAMPLE IV

In the first experiment, an equimolar mixture of $BF_3$ and cis$\times N_2F_2$ in $NF_3$ was held for 1 hour at $6.2\times10^3$ atm. and 82° C. When the mixture was cooled to room temperature and the pressure was released, only $NF_3$ was liberated. Later, however, both $N_2F_2$ and $BF_3$ were slowly liberated. The same reaction occurred at lower pressures, though with lower yields.

When $N_2F_2$ mixture containing 67 percent trans- and 33 percent cis-$N_2F_2$ was pressured with $BF_3$ to 185 atm., only the cis-$N_2F_2$ reacted to form a $BF_3$ compound. Pure trans-$N_2F_2$ (as determined by infrared spectroscopy) was recovered from the reactants, and pure cis-$N_2F_2$ was recovered from the product. Thus, the isomers can be separated and recovered in pure form.

EXAMPLE V

When a mixture containing 20 percent cis- and 80 percent trans-$N_2F_2$ was pressured with a large excess of $BF_3$ to 5,130 atm. all the cis-$N_2F_2$ was removed. The amount of $BF_3$ recovered showed that cis-$N_2F_2$ reacts with only one equivalent of $BF_3$.

Experiments on the formation of $N_2F_2$:$BF_3$ are summarized in table I. The reaction tube contained a white solid that fumed in air and looked like dry ice. The solid product from these experiments could be stored for weeks in a glass tube in dry ice. The last experiment in table I (where $BF_3$ is in excess of cis-$N_2F_2$) shows that the cis-$N_2F_2$ reacts with only one equivalent of $BF_3$.

TABLE I

Reactions of $N_2F_2$ with $BF_3$

| Feed | Pressure, atm. Highest | Final | Temperature °C. | Result |
|---|---|---|---|---|
| A | 6,200 | 500 | 82 | $NF_3$ recovered immediately. $BF_3$ and $N_2F_2$ in 24 hours of discharge. |
| A | 205 | 103 | 30 | 80 percent yield of white solid of which 75 percent decomposed in 1 hour at 910–1,240 mm. Hg. |
| A | 137 | 34.3 | 30 | 66 percent yield of white solid removed from nickel separator. |
| B | 185 | 34.3 | 24 | Only cis-$N_2F_2$ reacted, trans-$N_2F_2$ recovered with only a trace of cis. |
| C | 5,130 | 274 | 26 | Trans-$N_2F_2$ recovered unreacted with all cis-$N_2F_2$ removed. |

A. Contained 95 percent cis-$N_2F_2$, $BF_3$, and $NF_3$ in a mole ratio of 1 to 1 to 0.97.
B. Contained cis-$N_2F_2$, trans-$N_2F_2$, and $BF_3$ in a mole ratio of 1 to 2 to 3.
C. Contained cis-$N_2F_2$, trans-$N_2F_2$ and $BF_3$ in a mole ratio of 1 to 4.1 to 11.2.

EXAMPLE VI

Hexafluoroantimonate of the formula $N_2F_2$:$SbF_5$ was prepared as follows: A pair of AgCl windows were wet with a film of $SbF_5$ in a dry atmosphere and placed quickly in a steel chamber which was immediately evacuated. The liquid films were then exposed to cis-$N_2F_2$ for 10 minutes at room temperature. The chamber was then evacuated, filled with $N_2$, and opened. The windows were coated with a white solid. They were rubbed together to grind the solid and then they were tightly clamped together. The infrared spectrum of this compound is shown in FIG. 2.

EXAMPLE VII

To an evacuated separator tube were added $N_2F_2$ (1g.) and $PF_5$ (9 g.). Pressure was applied to the separator ranging from 3,000 to 10,000 p.s.i. 68° F. over a period of 16 hours. A stable white solid was formed. The white solid recovered was used to obtain the infrared spectra. The spectrum indicates that the white solid is hexafluorophosphate of the formula $N_2F_2$:$PF$. FIG. 3 indicates the infrared spectrum of this compound.

EXAMPLE VIII

A mixture of 2 g. of trans difluorodiazine and 1 g. of cis difluorodiazine with 3 g. of boron trifluoride was charged to a nickel reactor and pressured to 2,700 p.s.i. at 74° F. After 2 hours the pressure dropped to 500 p.s.i. The unreacted gases were then discharged and amounted to 4 g. Gas chromatographic and infrared analyses showed no more than a trace of cis difluorodiazine in this mixture of trans difluorodiazine and boron trifluoride. The reactor was allowed to discharge into an evacuated metal sample container for 2 hours and 1 g. of gas was obtained which was cis difluorodiazine and boron trifluoride, In addition some of the undecomposed solid was obtained when the reactor was opened.

The mixtures of separated difluorodiazines may be treated to remove the boron trifluoride by several methods. The boron trifluoride may be frozen (freezing point −127° C.) since the solid reaction product does not form at low temperatures, or distillation can be used. Boron trifluoride may also be removed by reaction with inorganic reagents with which it complexes readily, such as water or nitrosyl fluoride. The latter reagent may be reacted with fluorodiazonium fluoroborate to yield cis difluorodiazine directly.

In addition to boron trifluoride, the pentafluorides of group VA metals may be used. The pentafluorides of phosphorus and antimony will also react selectively with cis difluorodiazine to yield fluorodiazonium metal hexafluorides. This may be especially convenient for preparing pure trans difluorodiazine since little pressure is required, and some of these pentafluorides have low vapor pressures even at room temperature so the unreacted gas may simply be vented off. The recovery of cis difluorodiazine directly from arsenic or antimony compound undoubtedly will require heating since the compounds have considerable stability.

Cis and trans difluorodiazine are relatively close boiling compounds (b.p. −105.7° C. and −111.4° C. respectively) and have been difficult to purify. Molecular sieve columns have been used to obtain the pure trans isomer, but much of the material is lost by reaction with the sieves. Low-temperature distillation has been used to obtain nearly pure cis isomer, but infrared spectroscopy shows that samples purified in this way contain some trans isomer whereas this cannot be seen in the cis difluorodiazine prepared by decomposition of fluorodiazonium fluoroborate. The difluorodiazine is very useful in the vulcanization of fluoroelastomers. This use has been published in I & EC Product Research and Development, Vol. 2, Dec. 1963, starting with page 284.

We claim:

1. As a composition of matter, fluorodiazonium tetrafluoroborate.

2. As a composition of matter, fluorodiazonium hexafluorophosphate.

3. The process of separating cis difluorodiazine from trans difluorodiazine, said process comprising the preferentially reacting the cis isomer with boron trifluoride under elevated pressure.

PO-1050
(5/69)

UNITED STATES PATENT OFFICE
CERTIFICATE OF CORRECTION

Patent No. 3,615,269                    Dated October 26, 1971

Inventor(s) Luke A. Schaap, Alex Zletz and Thomas D. Nevitt

It is certified that error appears in the above-identified patent and that said Letters Patent are hereby corrected as shown below:

Col. 1, line 9   $BF_4^1$, $PF_6^1$ and $SbF_6^1$ should be $BF_4-$, $PF_6-$ and $SbF_6-$ Col. 1, line 12  $N_2F+BF_4^1$ should be $N_2F+BF_4-$ Col. 1, line 13  $N_2F+PF_6^1$ should be $N_2F+PF_6-$ Col. 1, line 14  $N_2F+SbF_6^1$ should be $N_2F+SbF_6-$ Col. 1, line 55  $BF_4^1$ should be $BF_4-$; 1,300 cm.$^{11}$ should be 1,300 cm.$^{-1}$ Col. 1, line 56  1,100 cm.$^{11}$ should be 1,100 cm.$^{-1}$ Col. 1, line 58  769 cm.$^{11}$ should be 769 cm.$^{-1}$ Col. 1, line 59  528 cm.$^{11}$ should be 528 cm.$^{-1}$ Col. 1, line 64  $BF_4^1$ should be $BF_4-$ ; cm.$^{11}$ should be cm.$^{-1}$ Col. 1, line 71  1,040 cm.$^{11}$ should be 1,040 cm.$^{-1}$; 1,100 cm.$^{11}$ should be 1,100 cm.$^{-1}$ Col. 1, line 72  $BF_4^1$ should be $BF_4-$ Col. 1, line 74  $BF_4^1$ should be $BF_4-$ Col. 2, line 1   word "may" repeated twice Col. 2, line 8   583 cm.$^{11}$ should be 583 cm.$^{-1}$ Col. 2, line 21  $BF_4^1$ should be $BF_4-$ Col. 2, line 26  1,000 cm.$^{11}$ should be 1,000 cm.$^{-1}$ Col. 2, line 30  $(SbF_6^1)$ should be $(SbF_6-)$ Col. 2, line 31  667 cm.$^{11}$ should be 667 cm.$^{-1}$; 1,057 cm.$^{11}$ should be 1,057 cm.$^{-1}$ Col. 2, line 34  10,32 cm.$^{11}$ should be 1,032 cm.$^{-1}$ Col. 2, line 36  520 cm.$^{11}$ should be 520 cm.$^{-1}$; 482 cm.$^{11}$ should be 482 cm.$^{-1}$ Col. 2, line 39  $PF_6^1$ should be $PF_6-$ Col. 2, line 41  825 cm.$^{11}$ should be 825 cm.$^{-1}$; 560 cm.$^{11}$ should be 560 cm.$^{-1}$ ; 1,057 cm.$^{11}$ should be 1,057 cm.$^{-1}$ Col. 2, line 42  695 cm.$^{11}$ should be 695 cm.$^{-1}$ Col. 3, line 12  $N_2F^+BF_4^1$ should be $N_2F^+BF_4^-$ Col. 3, line 24  cis x $N_2F_2$ should be cis-$N_2F_2$ Signed and sealed this 18th day of April 1972.

(SEAL)
Attest:

EDWARD M. FLETCHER, JR.
Attesting Officer

ROBERT GOTTSCHALK
Commissioner of Patents